No. 763,450. Patented June 28, 1904.

UNITED STATES PATENT OFFICE.

EDWARD FONDI WRIGHT, OF AUSTIN, TEXAS.

FERTILIZER.

SPECIFICATION forming part of Letters Patent No. 763,450, dated June 28, 1904.

Application filed March 29, 1904. Serial No. 200,602. (No specimens.)

*To all whom it may concern:*

Be it known that I, EDWARD FONDI WRIGHT, a citizen of the Kingdom of Great Britain, residing in Austin, Travis county, State of Texas, have invented a new and useful Improvement in Fertilizers; and I do hereby declare the following to be a full, clear, and exact description thereof.

The invention relates to compounds or fertilizing compositions for enriching the soil; and it consists of the elements and ingredients hereinafter particularly described.

The object of my invention is to increase the percentage of carbon, and consequently of sugar, in any kind of plant. By reason thereof sugar-cane, sugar-beet, and fruits—such as apples, oranges, peaches, pears, &c.—will be aided in better development. This compound will also be the means of taking up ammonia from the air to form nitrates in the soil, and consequently in plants grown in such soil, and the compound will therefore be a substitute for expensive nitrogenous manures. Aside from this, as many scale insects and parasitical and fungoid growths are found on plants and fruits, &c., that are wanting in either normal carbon compounds, proteids, sugars, fats, &c., it follows that when such compounds are restored by my composition to something like their normal percentages such scale insects and parasitical and fungoid growths will be removed. Therefore the use of my invention will result in a more profitable yield, and it will destroy parasitical growths.

My improved fertilizing compound consists of the following ingredients, which are preferably divided into the following relative proportions, though other proportions may be employed for different soils, to wit: iron sulfate, one hundred pounds; superphosphate of lime, two hundred pounds; kainite, two hundred pounds. Said iron sulfate, superphosphate of lime, and kainite in the amounts so stated are to be uniformly ground and mixed.

This mixture is applied by either drilling it into the soil with the seed or by sowing it broadcast.

I am aware that superphosphate and kainite or other potash manures are sold in combination, but am not aware that iron in any suitable form, superphosphate, and potash manures are ever sold in combination as a manure of any kind; neither am I aware that such a combination is ever sold either as a factor in producing sugar in plants or as a germicide to destroy parasitical growth in plant life through the chemical change produced in the plant or plants; nor am I aware that this compound is sold in any way with the object of assisting plant life to take up ammonia from the air to form nitrates in the soil.

Having thus described my invention, what I claim, and desire to secure by Letters Patent, is—

The within-described fertilizing compound composed of iron sulfate, superphosphate of lime and kainite commingled in the proportions above set out and used as above set forth.

EDWARD FONDI WRIGHT.

Witnesses:
 FRANZ FISET,
 F. LEE WILLIAMS.